United States Patent [19]

Nozaki

[11] Patent Number: 5,604,296
[45] Date of Patent: Feb. 18, 1997

[54] COMPLIANCE TESTER

[75] Inventor: Hiromichi Nozaki, Yokohama, Japan

[73] Assignees: Nissan Motor Co., Ltd., Kanagawa; Nissan Altia Co., Ltd., Tokyo, both of Japan

[21] Appl. No.: 508,569

[22] Filed: Jul. 27, 1995

[30] Foreign Application Priority Data

Jul. 27, 1994 [JP] Japan ..................... 6-175559
Dec. 28, 1994 [JP] Japan ..................... 6-326743

[51] Int. Cl.⁶ ..................................... G01M 17/04
[52] U.S. Cl. ............... 73/11.04; 33/203.12; 33/203.18; 33/336
[58] Field of Search ............... 73/11.04, 11.07, 73/11.08, 123, 124, 669, 862.454, 862.46; 33/203.12, 203.18, 203.19, 335, 336

[56] References Cited

U.S. PATENT DOCUMENTS

| | | | |
|---|---|---|---|
| 3,181,248 | 5/1965 | Manlove | 33/203.12 |
| 3,188,747 | 6/1965 | Race | 33/203.12 |
| 3,792,604 | 2/1974 | Fader et al. | 73/11.07 |
| 3,875,672 | 4/1975 | Castoe | 33/203.12 |
| 4,167,816 | 9/1979 | Jarman et al. | 33/203.12 |
| 4,768,374 | 9/1988 | Fouchey | 73/669 |
| 4,981,034 | 1/1991 | Haeg | 73/669 |
| 5,150,515 | 9/1992 | Merrill et al. | 33/203.12 |
| 5,313,710 | 5/1994 | Wakamori et al. | 33/203.12 |
| 5,375,464 | 12/1994 | Dadt | 73/11.04 |

*Primary Examiner*—Richard Chilcot
*Assistant Examiner*—Eric S. McCall
*Attorney, Agent, or Firm*—Lowe, Price, LeBlanc & Becker

[57] ABSTRACT

A compliance tester tests the flexibility of a motor vehicle suspension system which includes a bush. The tester comprises first and second bases between which is defined a fluid chamber whose volume is variable upon a vertical movement of the second base relative to the first base. Horizontally movably disposed on the second base is a table on which, upon testing the flexibility of the suspension system, a tire of the motor vehicle is put. A hydraulically operated power unit connected to the second base is fluidly connected to the fluid chamber. A piston of the power unit is connected to the table, so that when the tire of the vehicle is put on the table thereby compressing the fluid chamber, the power unit pushes the table thereby biasing a contact point of the tire in a given direction.

10 Claims, 16 Drawing Sheets

COMPLIANCE TESTER

BACKGROUND OF THE INVENTION

1. Field of the Invention

The present invention relates in general to testers for testing the performance of a suspension system of wheeled motor vehicles, and more particularly to a compliance tester which can test the flexibility of a suspension system including a bush.

2. Description of the Prior Art

For testing the flexibility of a suspension system including a bush, a so-called "chassis static characteristic tester" has been widely used. In the test, the vehicle is mounted on the tester, and the wheel alignment is measured while producing bounding condition, rebounding condition, rolling condition and the like by the tester. By analyzing the wheel alignment thus measured, the flexibility of the suspension system including the bush is derived.

However, due to its inherent construction, the above-mentioned conventional tester has the following drawbacks.

(1) The measurement is limited to the wheel alignment effected under a static and specific condition. Thus, even if the bush of the suspension system has been deteriorated to a certain level, the deterioration of the bush can not be found out in case wherein the bush deterioration fails to exert a marked influence upon the result of the static measurement of the wheel alignment.

(2) The tester is large in size and requires a specified power unit (viz., hydraulic power unit, etc.,), which results in greater assembling space and greater cost.

For the reasons as mentioned above, the user of such chassis static characteristic tester has been limited to only car makers and the like. That is, hitherto, such large and high cost tester has not been commonly used in car dealers and service factories. In fact, sometimes, the replacement of a deteriorated bush with a new one has been made by the car mechanic by using simple tools. Thus, nowadays, development of an improved compliance tester which is free of the above-mentioned drawbacks has been eagerly required.

SUMMARY OF THE INVENTION

It is therefore an object of the present invention to provide a compliance tester which is low in cost, compact in size and can accurately test the flexibility of a motor vehicle suspension system including a bush.

It is another object of the present invention to provide a compliance tester which can test the flexibility of the suspension system under the condition wherein a biasing force is applied to a contact point of tire in a transverse direction, a longitudinal direction or a toe angle direction.

It is a further object of the present invention to provide a compliance tester which can serve as a turning radius measuring device.

It is a still further object of the present invention to provide a compliance tester which can test the flexibility of a motor vehicle suspension system including a bush, which flexibility is not influenced by the rigidity of the tire.

According to the present invention, there is provided a compliance tester which effectively uses the weight of a motor vehicle as power means for producing a force by which the contact point of a tire is biased in a given direction.

According to a first aspect of the present invention, there is provided a compliance tester for testing the flexibility of a motor vehicle suspension system which includes a bush. The tester comprises a first base; a second base arranged above the first base; means defining a fluid chamber whose volume varies when the second base vertically moves relative to the first base; a table horizontally movably disposed on the second base, the table having an upper surface on which a tire of the motor vehicle is to be put; a hydraulically operated power unit moved together with the second base, the power unit having a piston connected to the table; and means for fluidly connecting the fluid chamber to a power chamber of the power unit.

According to a second aspect of the present invention, there is provided a compliance tester for testing the flexibility of a motor vehicle suspension system which includes a bush. The compliance tester comprises a first base; a second base arranged above the first base and vertically movable relative to the first base; chamber means defining a fluid chamber whose volume varies when the second base vertically moves relative to the first base; a table which moves on an upper surface of the second base, the table having an upper surface on which a tire of the motor vehicle is to be put; a power cylinder unit moved together with the second base, the power cylinder unit having a hydraulically operated piston whose rod is connected to the table; passage means for fluidly connecting the fluid chamber of the chamber means with a fluid chamber of the power cylinder unit; pressure measuring means for measuring the fluid pressure in the fluid chamber of the power cylinder unit; and angular displacement measuring means for measuring a relative angular displacement between the second base and the table, or a relative angular displacement between the table and a given portion of the vehicle body.

According to a third aspect of the present invention, there is provided a compliance tester for testing the flexibility of a motor vehicle suspension system which includes a bush. The compliance tester comprises a first base; a second base arranged above the first base and vertically movable relative to the first base; chamber means defining a fluid chamber whose volume varies when the second base vertically moves relative to the first base; a table which moves on an upper surface of the second base, the table having an upper surface on which a tire of the motor vehicle is to be put; a power cylinder unit moved together with the second base, the power cylinder unit having a hydraulically operated piston whose rod is connected to the table; passage means for fluidly connecting the fluid chamber of the chamber means with a fluid chamber of the power cylinder unit; pressure measuring means for measuring the fluid pressure in the fluid chamber of the power cylinder unit; and angular displacement measuring means for measuring a relative angular displacement between a road wheel which has the tire mounted thereon and a given portion of the vehicle body.

BRIEF DESCRIPTION OF THE DRAWINGS

FIG. 18a is an enlarged view of a part of FIG. 18, showing a manner in which a measurement base plate is connected to one of hub bolts of a road wheel;

DETAILED DESCRIPTION OF THE EMBODIMENTS

Figure 2:
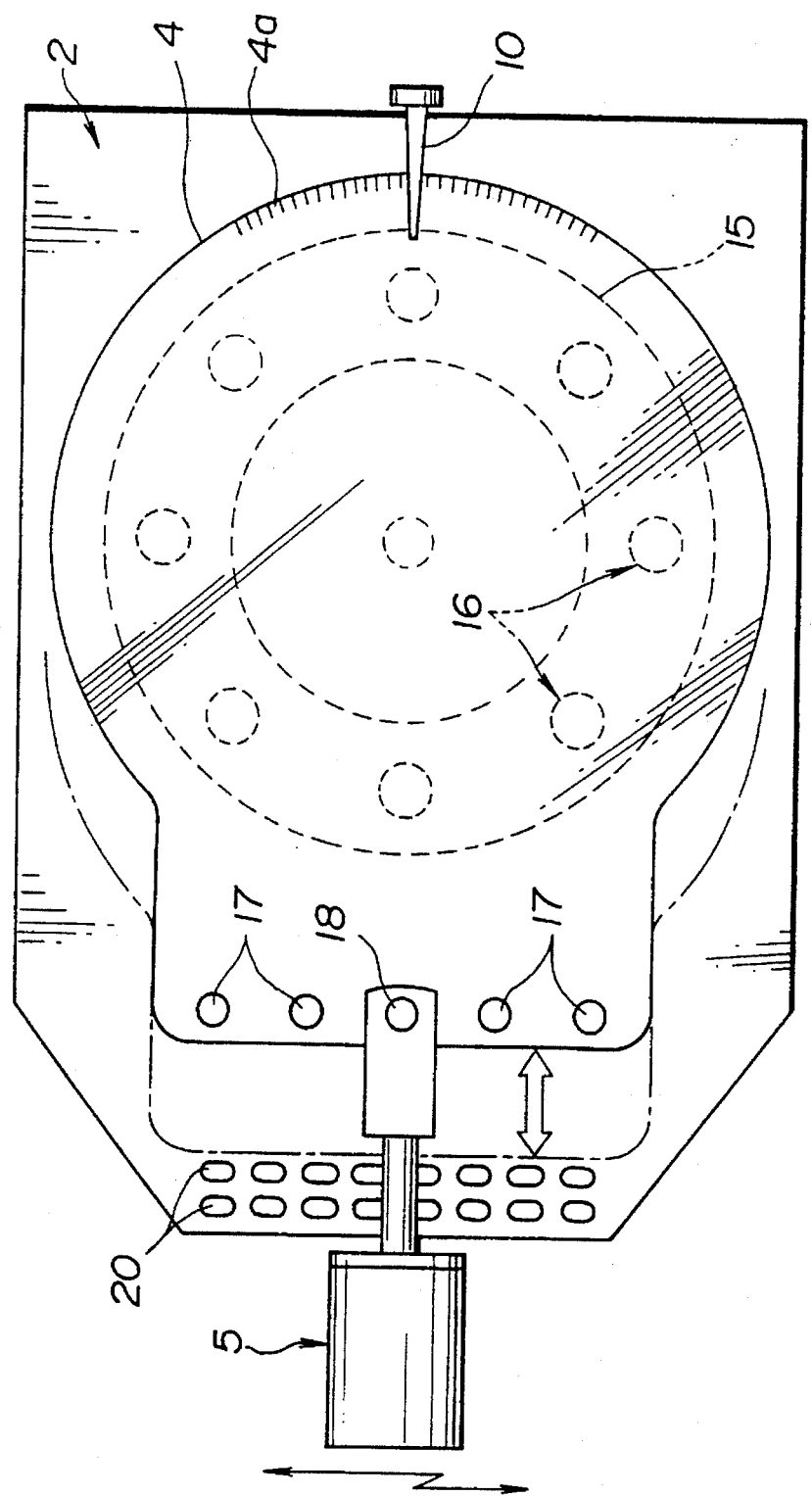
FIG. 2 is a plan view of a compliance tester which is a first embodiment of the present invention.
Figure 3:
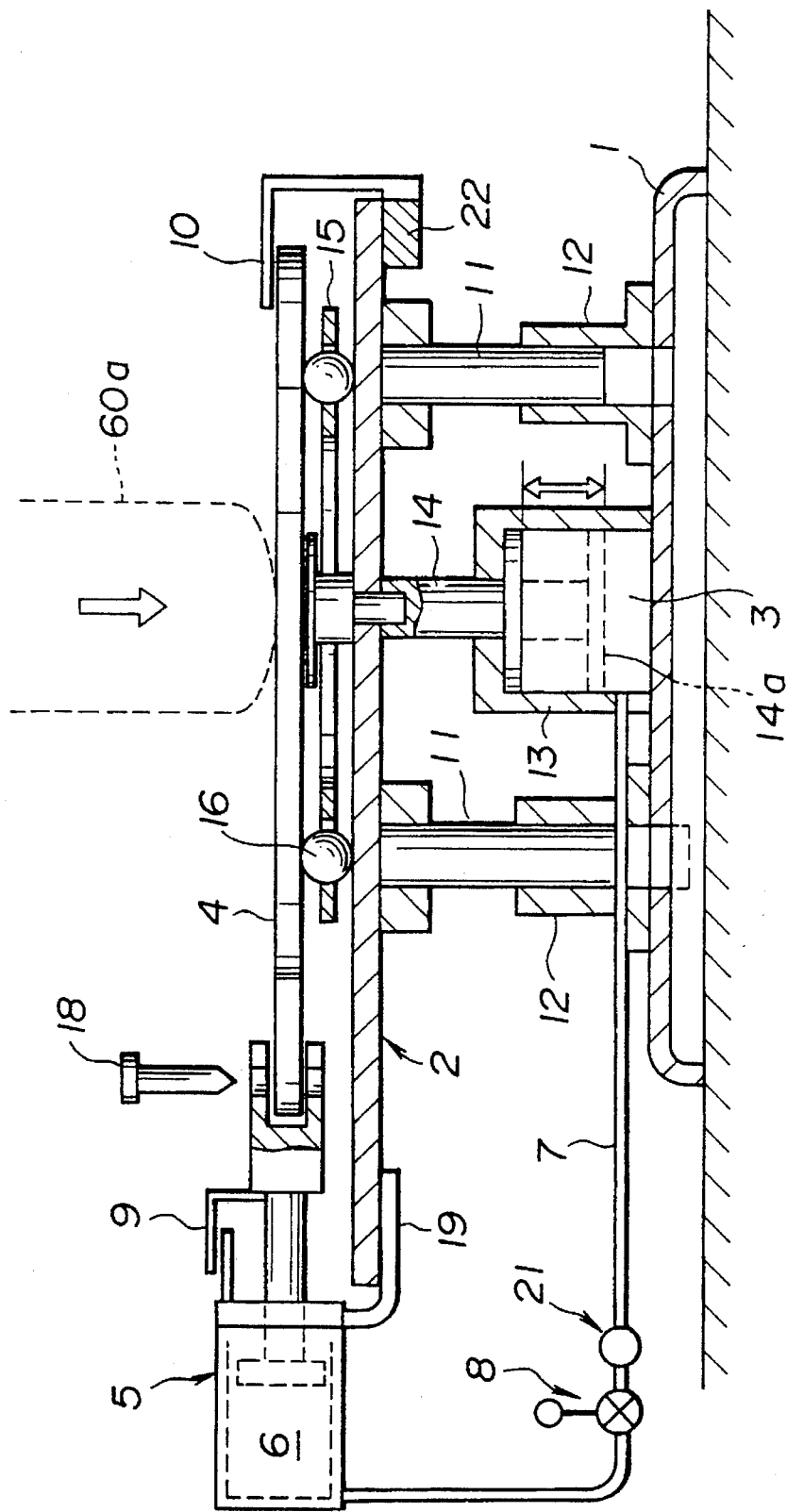
FIG. 3 is a side view of the compliance tester of the first embodiment.

Referring to FIGS. 2 and 3 of the drawings, there is shown a compliance tester which is a first embodiment of the present invention.

In the drawings, denoted by numeral 1 (see FIG. 3) is a tester supporting base, 2 is a vertically movable base, 3 is a volume variable oil chamber, 4 is a turn table, 5 is a power cylinder unit, 6 is an oil chamber, 7 is a connecting pipe, 8 is a pressure regulating valve with a pressure indicator, 9 is a stroke gauge and 10 is a rotation angle pointer.

The vertically movable base 2 is mounted on guide structures which are disposed on the tester supporting base 1. Each guide structure comprises a cylindrical guide member 12 fixed to the supporting base 1 and a guide bar 11 fixed to the vertically movable base 2, the guide bar 11 being slidably inserted into the guide member 12. Thus, due to the work of the guide structures, the movable base 2 can vertically move relative to the supporting base 1. As is seen from FIG. 2, the vertically movable base 2 is formed, at one end portion facing the power cylinder unit 5, with a plurality of connecting bores 20 for the reason which will become apparent hereinafter.

The volume variable oil chamber 3 is defined by both a cylinder 13 which is fixed to the tester supporting base 1 and a piston 14a which is fixed to the vertically movable base 2 through a piston rod 14. Thus, with upward or downward movement of the base 2, the volume of the oil chamber 3 is varied.

The turn table 4 is disposed on the vertically movable base 2 through steel balls 16 which are rotatably held by an annular retainer 15. Thus, the turn table 4 can slide and turn on the vertically movable base 2. As is seen from FIG. 2, the turn table 4 has a rectangular peripheral part which is directed toward the power cylinder unit 5.

The power cylinder unit 5 is of a type which comprises one cylinder and one piston. The piston has a rod which is connected through a lock pin 18 to one of offset bores 17 formed in the rectangular peripheral part of the turn table 4. Thus, by selecting an offset bore 17 through which the piston rod is connected to the rectangular part of the turn table 4, the positional relationship (viz., relative angular displacement) between the power cylinder unit 5 and the turn table 4 is changed or adjusted.

As is seen from FIG. 3, a bracket 19 is secured to the cylinder of the power cylinder unit 5. The leading end of the bracket 19 is connected to one of the connecting bores 20 of the vertically movable base 2 by means of bolt and nut (not shown). Thus, by selecting a connecting bore 20 though which the bracket 19 is connected to the vertically movable base 2, the positional relationship between the power cylinder unit 5 and the vertically movable base 2 is changed or adjusted.

The connecting pipe 7 connects the oil chamber 6 and the volume variable oil chamber 3. The pressure regulating valve 8 and a needle valve 21 are disposed in the connecting pipe 7. The needle valve 21 is arranged between the pressure regulating valve 8 and the volume variable oil chamber 3, as shown.

The stroke gauge. 9 measures a relative horizontal displacement between the vertically movable base 2 and the turn table 4.

The rotation angle pointer 10 is detachably connected to the vertically movable base 2 by means of a magnet 22 and points the rotation angle of the turn table 4 relative to the vertically movable base 2. For this rotation angle pointing, the turn table 4 is formed with a graduation 4a as is seen in FIG. 2.

In the following, operation of the compliance tester of the first embodiment will be described with reference to the drawings, particularly FIG. 3. (It is to be noted that the references parenthesized indicate the parts shown in FIG. 1)

When, for testing the flexibility of a suspension system which includes a bush, a tire 60a or (TA, TB) of a road wheel 60 or (j) is put on the turn table 4 or (d), the vertically movable base 2 or (b) bears a unit load per travel wheel and a certain downward force is applied to the contact point of the tire 60a where the tire 60a contacts the turn table 4 or (d). The downward force is applied to the oil in the volume variable oil chamber 3 or (c) arranged between the tester supporting base 1 (a) and the vertically movable base 2 or (b). With this, the oil is forced to flow from the volume variable oil chamber 3 or (c) to the oil chamber 6 or (f) of the power cylinder unit 5 or (e) through the connecting pipe 7 or (g), so that the pressure of the oil chamber 6 or (f) is increased. Thus, the power cylinder unit 5 or (e) presses through the piston the turn table 4 or (d) by a certain force which is obtained by multiplying the pressure in the oil chamber 6 or (f) by the pressure receiving area of the piston. That is, a certain tangential force and a certain moment are applied to the contact point of the tire 60a. That is, by connecting the two oil chambers 3 or (c) and 6 or (f) through the connecting pipe 7 or (g), the unit load per travel wheel in a vertical direction is transformed to a transverse force with which the turn table 4 or (d) is pressed, which means that a certain tangential force and a certain moment are applied to the point where the tire 60a contacts the turn table 4 or (d).

Figure 4:
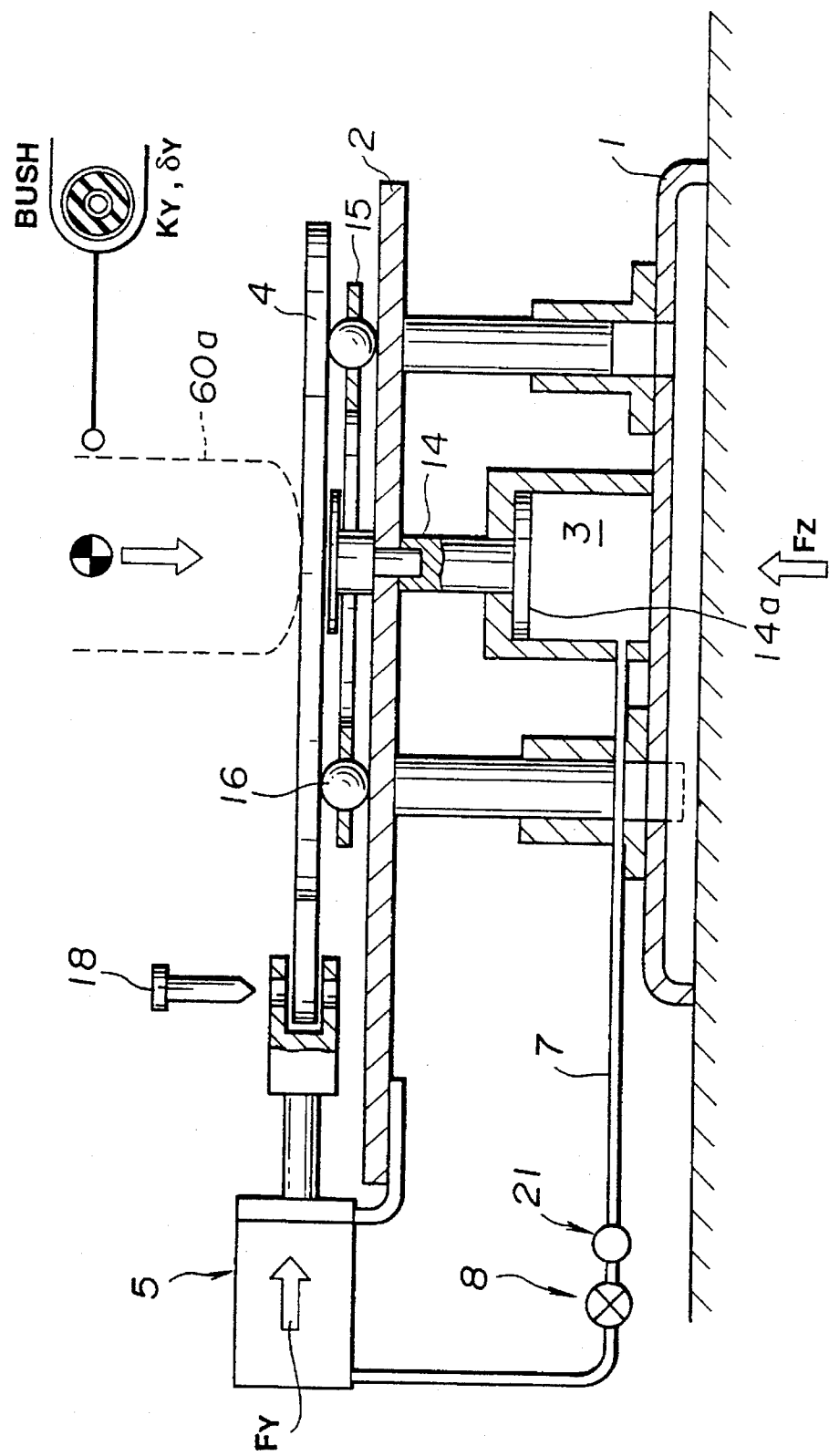
FIG. 4 is a view similar to FIG. 3, but showing various forces appearing when the tester is in use.

The force balance appearing in this case will be described in the following with reference to FIG. 4.

If the unit load per travel wheel, the vertical force at the contact point of the tire 60a, the transverse force by the oil, the rigidity of the bush and the flexibility of the bush are represented by "W", "Fz", "Fy", "Ky" and "δy" respectively, the balanced force in vertical direction is represented by:

$$W = Fz \qquad (1)$$

and the balanced force in transverse direction is represented by:

$$Fy = Ky \cdot \delta y \qquad (2)$$

If the pressure receiving area of the oil chamber 3 is represented by "SA" and that of the oil chamber 6 is represented by "SB", the transverse force "Fy" created by the compressed oil is represented by the following equation:

$$Fy = Fz \cdot (SB/SA) \qquad (3)$$

(It is to be noted that the transverse force "Fy" can be controlled by the pressure regulating valve 8 )

TRANSVERSE FORCE APPLICATION MODE

Figure 5:
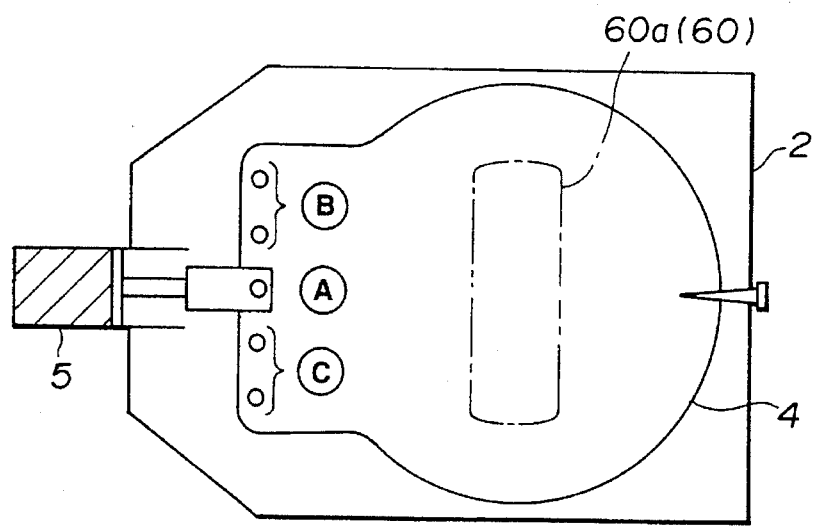
FIG. 5 is a schematic view of the tester in a condition wherein the flexibility of a suspension system is being measured under a transverse force application mode.

This is the mode wherein the transverse force is applied to the contact point of the tire 60a. As is understood from FIG. 5, in this mode, the connection of the piston rod of the power cylinder unit 5 to the turn table 4 and that of the body of the power cylinder unit 5 to the vertically movable base 2 are made through the position "A" to which the force from the power cylinder unit 5 is directly applied. That is, in this mode, the tire 60a is so arranged that the force from the power cylinder unit 5 is applied in a direction perpendicular to the direction in which the road wheel 60 runs.

With this, the contact point of the tire 60a is applied with the transverse force. The transverse force "FYL" is derived by multiplying the pressure in the oil chamber 6, which is indicated by the indicator of the pressure regulating valve 8, by the pressure receiving area of the piston of the cylindrical power unit 5. The transverse displacement "xYL" of the contact point of the tire 60a is measured by the stroke gauge 9.

Thus, the transverse rigidity "KYL" is obtained from the following equation:

$$KYL = FYL/xYL \qquad (4)$$

Furthermore, the transverse compliance "δYL" is obtained from the following equation:

$$\delta YL = xYL/FYL \qquad (5)$$

LONGITUDINAL FORCE APPLICATION MODE

Figure 6:
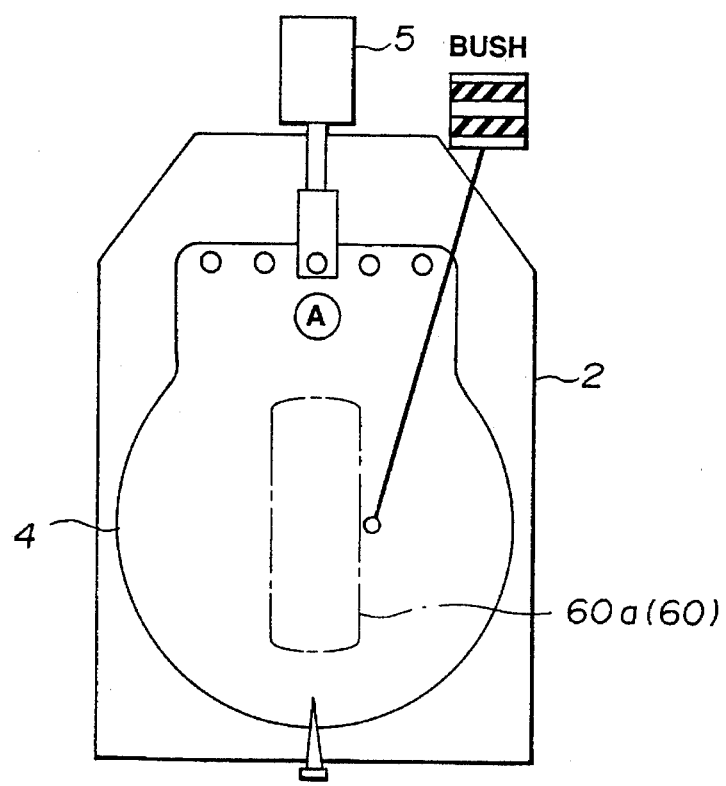
FIG. 6 is a view similar to FIG. 5, but in a condition wherein the flexibility is being measured under a longitudinal force application mode.

This is the mode wherein a longitudinal force is applied to the contact point of the tire 60a. As is understood from FIG. 6, in this mode, the connection of the piston rod of the power cylinder unit 5 to the turn table 4 and that of the body of the power cylinder unit 5 to the vertically movable base 2 are made through the position "A" to which the force from the power cylinder unit 5 is directly applied. That is, in this mode, the tire 60a is so arranged that the force from the power cylinder unit 5 is applied in a direction parallel to the direction in which the road wheel 60 runs.

With this, the contact point of the tire 60a is applied with the longitudinal force. Similar to the above-mentioned mode, the longitudinal force "FXL" is derived by multiplying the pressure in the oil chamber 6 by the pressure receiving area of the piston of the cylindrical power unit 5. The longitudinal displacement "xXL" of the contact point of the tire 60a is measured by the stroke gauge 9.

Thus, the longitudinal rigidity "KXL" is obtained from the following equation:

$$KXL = FXL/xXL \qquad (6)$$

Furthermore, the longitudinal compliance "δXL" is obtained from the following equation:

$$\delta XL = xXL/FXL \qquad (7)$$

TOE ANGLE DIRECTED FORCE APPLICATION MODE

This is the mode wherein an angular moment (or force) is applied to the contact point of the tire 60a in a toe angle direction. As is understood from FIG. 5, in this mode, the connection of the piston rod of the power cylinder unit 5 to the turn table 4 and that of the body of the power cylinder unit 5 to the vertically movable base 2 are made through the position "B" or "C" to which the force from the power cylinder unit 5 is directly applied. As is seen, the positions "B" and "C" are offset positions with respect to the contact point of the tire 60a.

Figure 7:
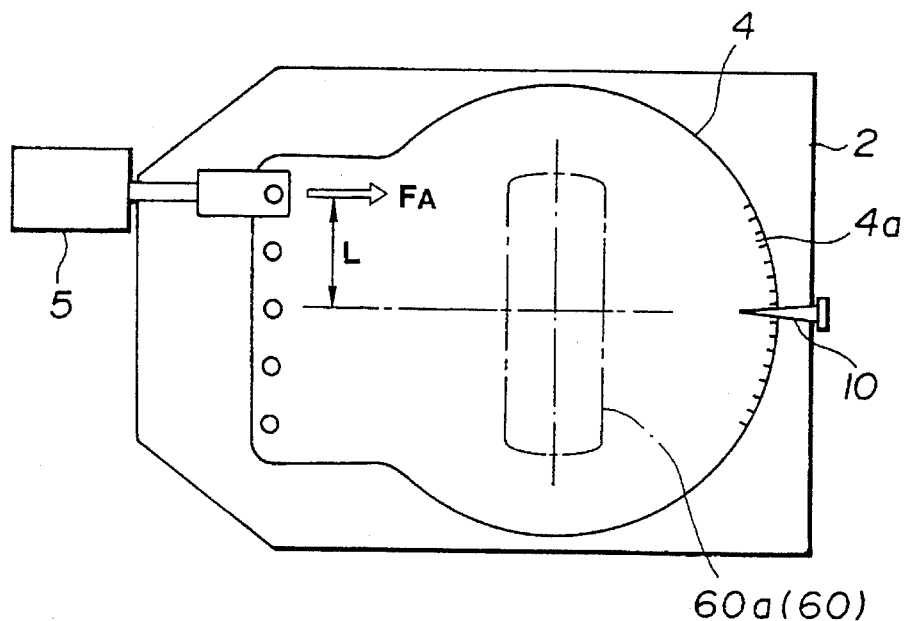
FIG. 7 is a view similar to FIG. 5, but in a condition wherein the flexibility is being measured under a toe angle directed force application mode.

With this, the contact point of the tire 60a is applied with an angular moment in a toe angle direction. As will be seen from FIG. 7, the angular moment "MA" is derived from the following equation:

$$MA = FA \cdot L \qquad (8)$$

wherein:
FA: product of the pressure in the oil chamber 6 and the pressure receiving area of the piston of the cylindrical power unit 5.
L: moment span.

The angle of rotation "θ" of the tire 60a at the tire contact point is measured by the rotation angle pointer 10.

Thus, the rigidity "Kθ" in the toe angle direction is obtained from the following equation:

$$K\theta = MA/\theta \qquad (9)$$

and, the compliance in the toe angle direction is obtained from the following equation:

$$\delta\theta = \theta/MA \qquad (10)$$

TIRE STEERED ANGLE MEASURING MODE

Figure 8:
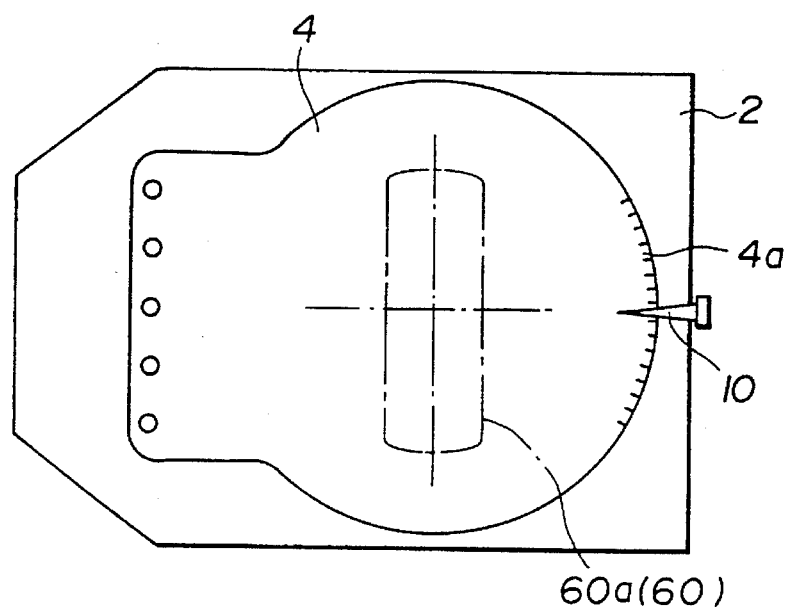
FIG. 8 is a view similar to FIG. 5, but showing a condition wherein a tire steered angle is being measured.

This is the mode for measuring the steered angle of the tire 60a. This mode is available because the turn table 4 can slide and turn on the vertically movable base 2. That is, as is seen from FIG. 8, after disconnecting the turn table 4 from the power cylinder unit 5, the tire 60*a* is put on the turn table 4 and then a steering wheel (not shown) of the associated motor vehicle is manipulated. The steered angle of the tire 60*a* can be measured by the rotation angle pointer 10. That is, the compliance tester can serve as a turning radius measuring device.

In the following, advantages of the compliance tester of the first embodiment will be described.

(1) Due to the above-mentioned unique construction, the compliance tester does not need a specified hydraulic power unit. That is, in the invention, the weight of the vehicle (more specifically, the unit load per travel wheel) is effectively used for testing the compliance of a suspension system. Thus, the compliance tester can be produced at a lower cost and compact in size.

(2) Due to the above-mentioned unique construction, the compliance tester can serve as a turning radius measuring device.

(3) Due to provision of the pressure regulating valve 8, the force applied to the contact point of the tire 60*a* can be adjusted.

Figure 9:
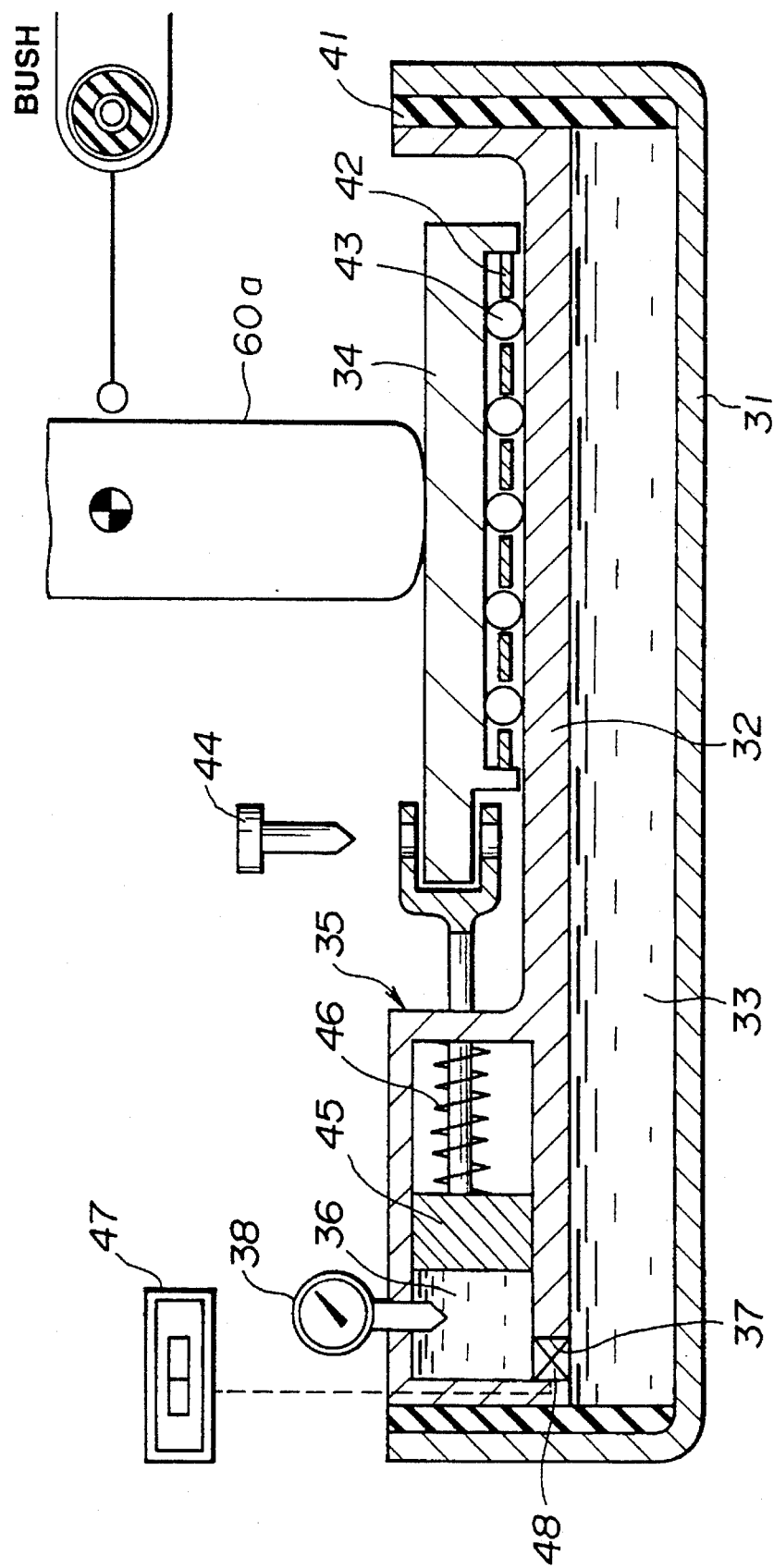
FIG. 9 is a side view of a compliance tester which is a second embodiment of the present invention.
Figure 10:
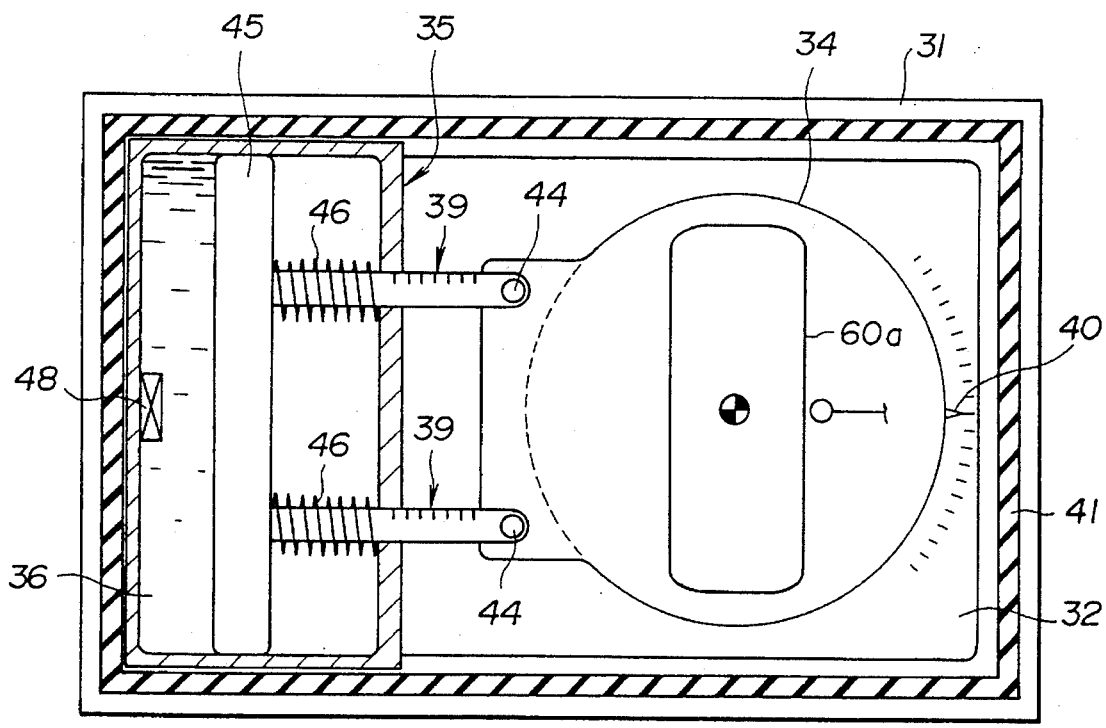
FIG. 10 is a plan view of the compliance tester of the second embodiment.

Referring to FIGS. 9 and 10, there is shown a compliance tester which is a second embodiment of the present invention.

In the drawings, denoted by numeral 31 is a tester supporting base, 32 is a vertically movable base, 33 is a volume variable oil chamber, 34 is a turn table, 35 is a power cylinder unit, 36 is an oil chamber, 37 is a connecting passage, 38 is a pressure gauge, 39 (see FIG. 10) is a stroke gauge and 40 (see FIG. 10) is a rotation angle pointer.

The vertically movable base 32 is vertically slidably disposed in a recessed portion of the tester supporting base 1. For achieving an oiltight, a suitable seal member 41 is lined on an inner surface of the recessed portion of the tester supporting base 1, as shown.

The volume variable oil chamber 3 is defined by both the recessed portion of the tester supporting base 31 and the vertically movable base 32. Thus, with upward or downward movement of the base 32, the volume of the oil chamber 33 is varied.

The turn table 34 is disposed on the vertically movable base 32 through steel balls 43 which are rotatably held by concentric annular retainers 42. Thus, the turn table 34 can slide and turn on the vertically movable base 2. As is seen from FIG. 10, the turn table 34 has a rectangular peripheral part which is directed toward the power cylinder unit 35.

As is seen from FIG. 10, the power cylinder unit 35 comprises the oil chamber 36, a piston 45 and two piston rods. The oil chamber 36 is defined in a thick portion of the vertically movable base 32. The piston rods extending from the piston 45 are detachably connected through respective lock pins 44 to spaced bores formed in the rectangular peripheral part of the turn table 34. As will be described hereinafter, in a certain mode, one of the piston rods is disconnected from the turn table 34. Disposed about each piston rod is a coil spring by which the piston 45 is biased toward the oil chamber 36.

Referring back to FIG. 9, the connecting passage 37 connects the oil chamber 36 of the power cylinder unit 35 and the volume variable oil chamber 33. Within the connecting passage 37, there is disposed an electromagnetic valve 48 which is controlled by an ON/OFF switch 47.

As is seen from FIG. 10, the stroke gauge 39 measures a relative horizontal displacement between the vertically movable base 32 and the turn table 34. The gauge 39 comprises a graduation formed in each piston rod, as shown.

The rotation angle pointer 40 is fixed to the turn table 34 to point the rotation angle of the turn table 34 relative to the vertically movable base 32. For this rotation angle pointing, the vertically movable base 32 is formed with a graduation as shown.

In the following, operation of the compliance tester of the second embodiment will be described with reference to the drawings, particularly FIG. 9.

When, for testing the flexibility of a suspension system which includes a bush, a road wheel is put on the turn table 34, the vertically movable base 32 bears a unit load per travel wheel and a certain downward force is applied to the contact point of the tire 60*a* where the tire 60*a* contacts the turn table 34. The downward force is applied to the oil in the volume variable oil chamber 33. With this, the oil is forced to flow from the volume variable oil chamber 33 to the oil chamber 36 of the power cylinder unit 35 through the connecting passage 37, so that the pressure of the oil chamber 36 is increased. Thus, the power cylinder unit 5 presses, through the piston 45 and the piston rods, the turn table 34 by a certain force. Thus, a certain tangential force and a certain moment are applied to the contact point of the tire 60*a*.

Figure 11:
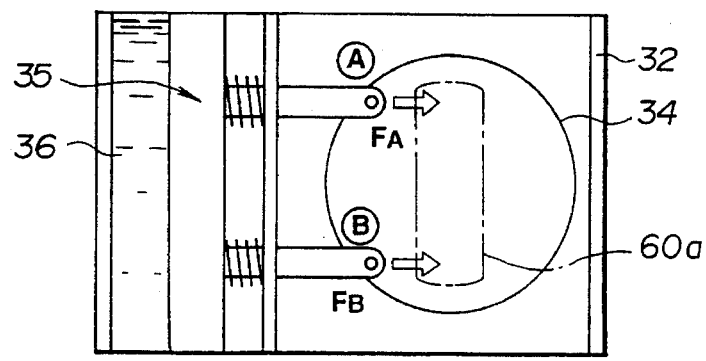
FIG. 11 is a schematic view of the tester of the second embodiment in a condition wherein the flexibility is being measured under a transverse force application mode.
Figure 12:
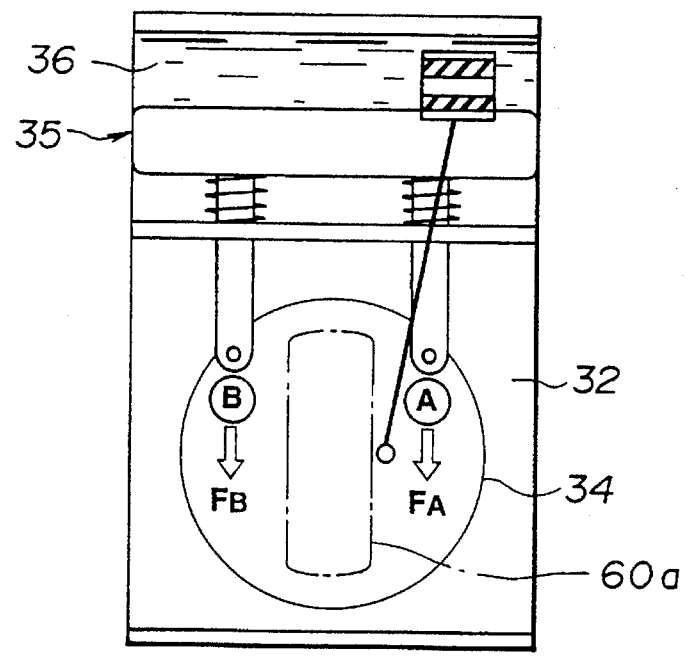
FIG. 12 is a view similar to FIG. 11, but in a condition wherein the flexibility is being measured under a longitudinal force application mode.
Figure 13:
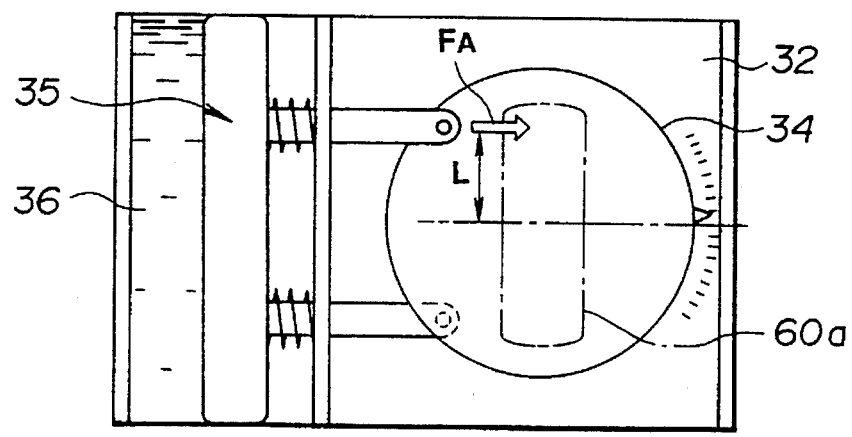
FIG. 13 is a view similar to FIG. 11, but in a condition wherein the flexibility ms being measured under a toe angle directed force application mode.

Thus, similar to the case of the above-mentioned first embodiment, the transverse force application mode (see FIG. 11), the longitudinal force application mode (see FIG. 12) and the toe angle directed force application mode (see FIG. 13) can be provided by the compliance tester of the second embodiment. As is seen from FIG. 13, in the toe angle directed force application mode, one of the piston rods is disconnected from the turn table 34.

Thus, the flexibility of a suspension system including a bush can be tested by the compliance tester of the second embodiment. Furthermore, the compliance tester can serve as a turning radius measuring device. Of course, in this case, both the piston rods are disconnected from the turn table 34.

In the following, advantages of the compliance tester of the second embodiment will be described.

(1) The weight of the vehicle is effectively used for testing the compliance of the tire. Thus, the compliance tester can be produced at a lower cost and compact in size.

(2) The compliance tester can serve as a turning radius measuring device.

(3) By suitably controlling the electromagnetic valve 48 by the switch 47, the force applied to the contact point of the tire can be adjusted.

(4) Because of the construction wherein the vertically movable base 32 is entirely received in the recessed portion of the tester supporting base 31, the compliance tester of the second embodiment can be constructed much compact as compared with that of the above-mentioned first embodiment.

Figure 14:
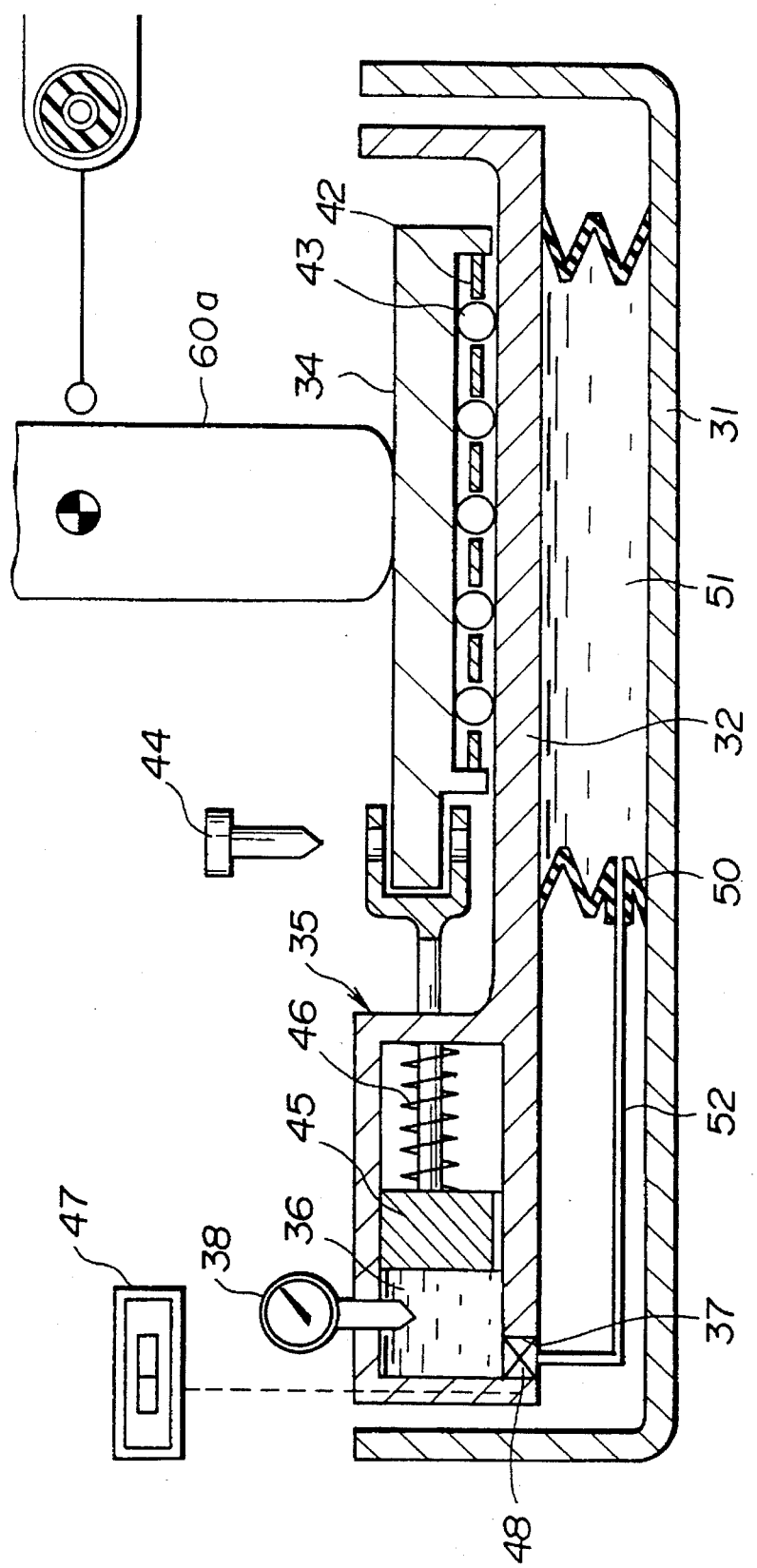
FIG. 14 is a side view of a compliance tester which is a third embodiment of the present invention.
Figure 15:
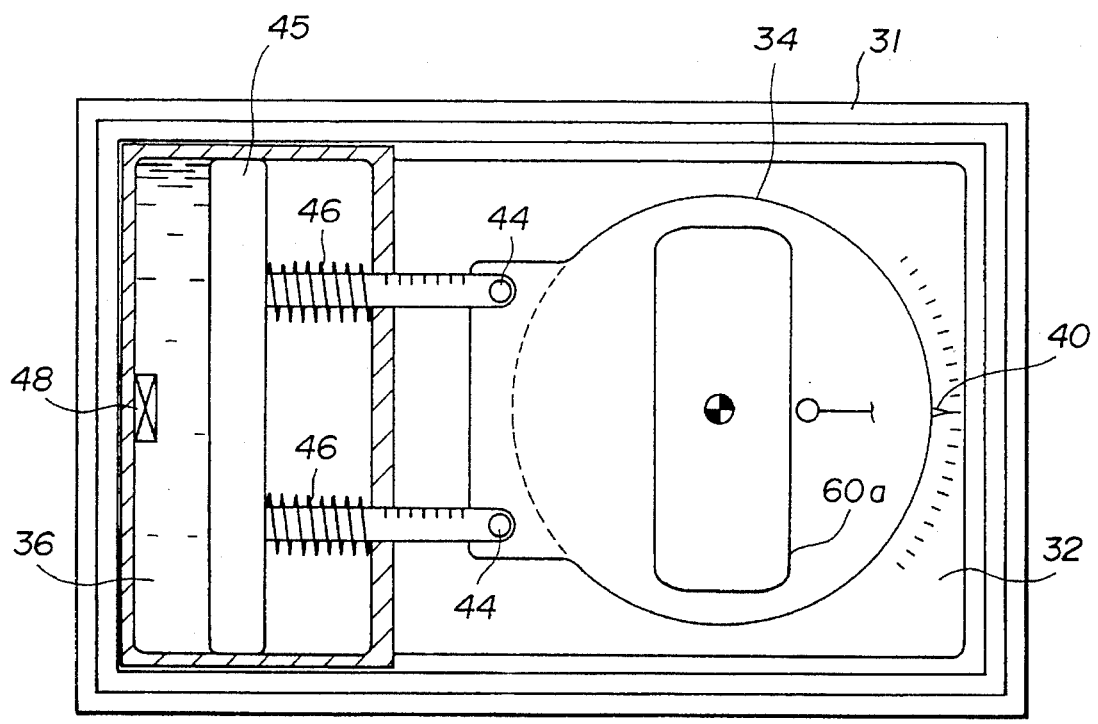
FIG. 15 is a plan view of the tester of the third embodiment.

Referring to FIGS. 14 and 15, there is shown a compliance tester which is a third embodiment of the present invention.

Since the tester of this third embodiment is similar to that of the above-mentioned second embodiment, only portions which are different from those of the second embodiment will be described in the following. The same portions and parts as those of the second embodiment are denoted by the same numerals.

That is, as is seen from FIG. 14, in place of the volume variable oil chamber 33 (see FIG. 9) used in the second embodiment, a bellow structure 50 is employed in the third embodiment. The bellow structure 50 is constructed of flexible rubber and arranged between the tester supporting base 31 and the vertically movable base 32. A volume variable oil chamber 51 defined by the bellow structure 50 is connected to the oil chamber 36 of the power cylinder unit 35 through a connecting pipe 52. More specifically, the connecting pipe 52 from the bellow structure 50 is connected to the connecting passage 37 in which the electromagnetic valve 48 is operatively disposed.

As is easily understood by those skilled in the art, the operation of the compliance tester of the third embodiment is substantially the same as that of the second embodiment. Furthermore, advantages possessed by this third embodiment are the same as those of the second embodiment. Due to usage of the bellow structure 50, the oiltight chamber can be readily provided as compared with the second embodiment.

Figure 16:
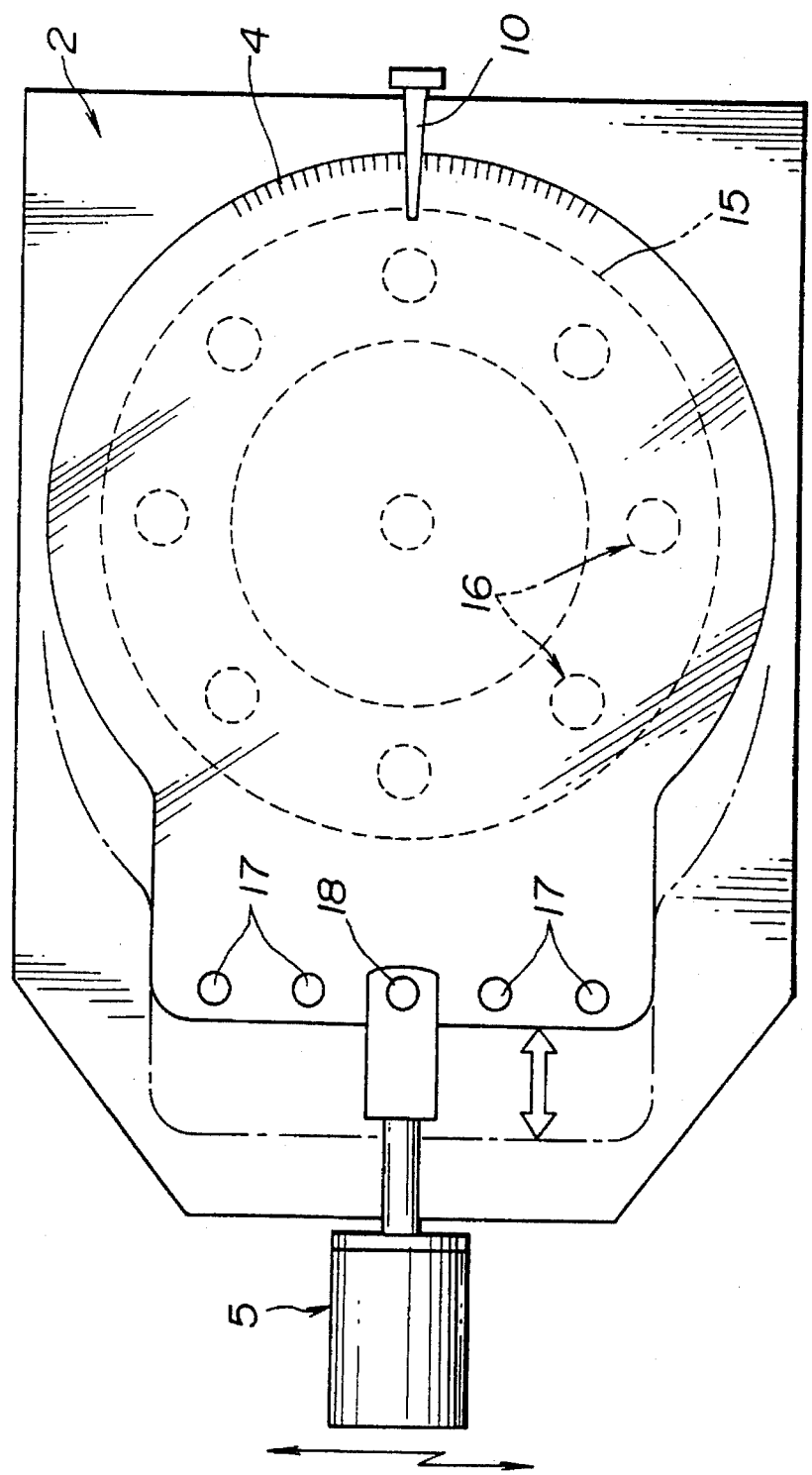
FIG. 16 is a plan view of a compliance tester which is a fourth embodiment of the present invention.
Figure 17:
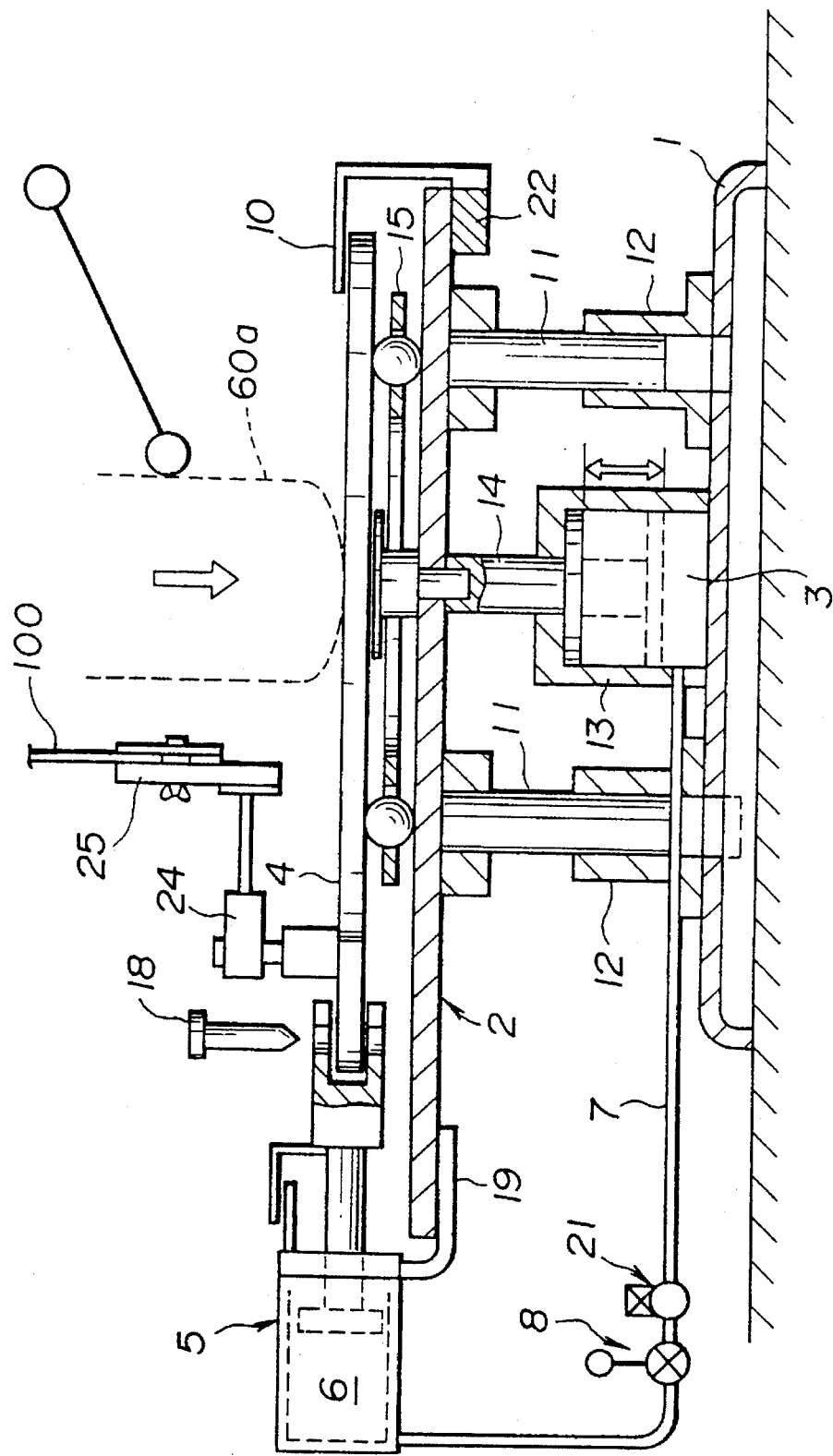
FIG. 17 is a side view of the tester of the fourth embodiment.

Referring to FIGS. 16 and 17, there is shown a compliance tester which is a fourth embodiment of the present invention.

Since the tester of this fourth embodiment is similar to that of the above-mentioned first embodiment, only portions which are different from those of the first embodiment will be described in the following. The same portions and parts as those of the first embodiment are denoted by the same numerals.

As is seen from FIG. 17, in place of the needle valve 21 (see FIG. 3) and stroke gauge 9 (see FIG. 3) used in the first embodiment, an electromagnetic valve 23 and a displacement gauge 24 are employed in the fourth embodiment. That is, the displacement gauge 24 is arranged to measure a relative displacement between the turn table 4 and the vehicle body. Designated by numeral 25 is a bracket which is fixed to a side sill 100 of the vehicle body for operating the displacement gauge 24.

Figure 1:
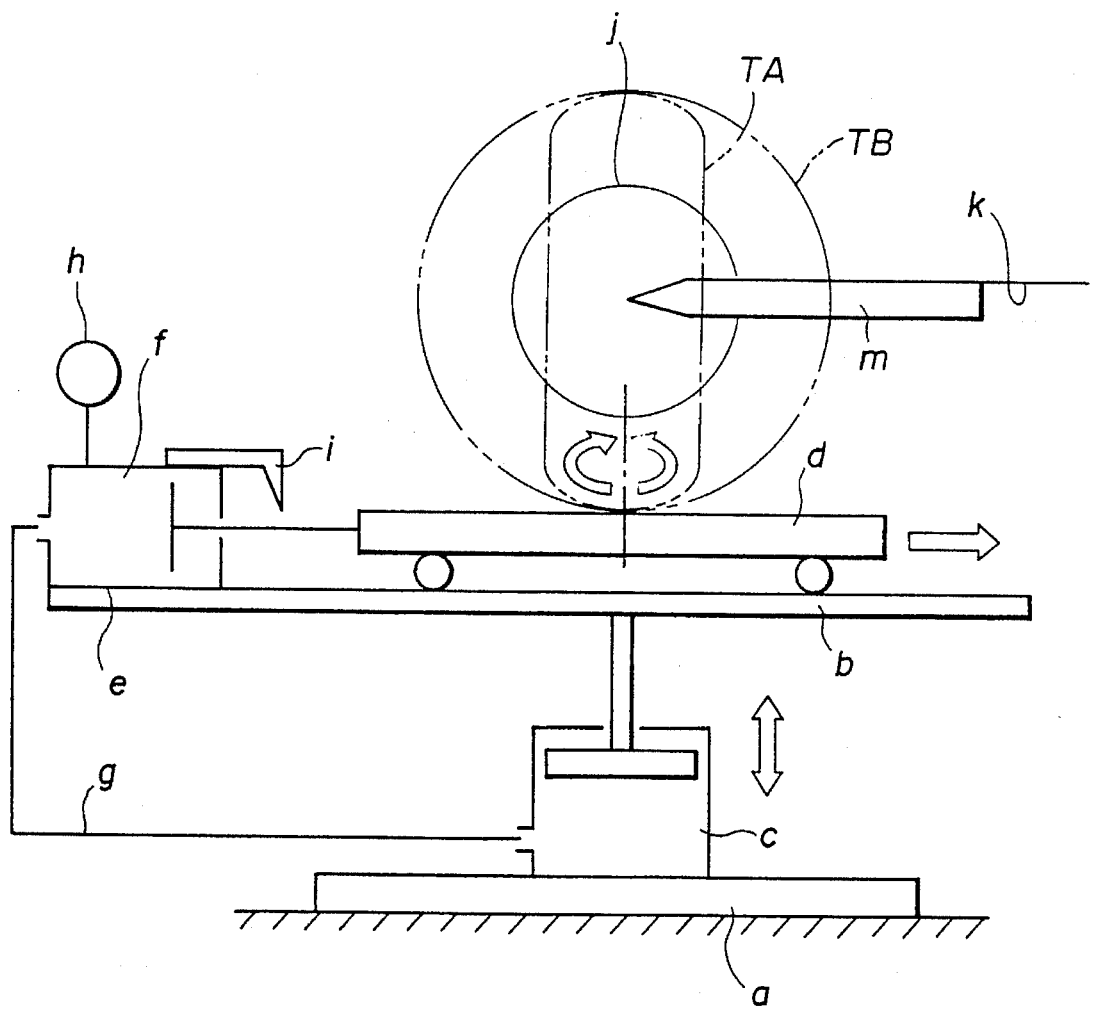
FIG. 1 is a schematic view of a compliance tester, which depicts the principle of the present invention.

It is to be noted that the side sill 100 and the displacement gauge 24 are denoted by references "k" and "m" in FIG. 1.

In the following, operation will be described with respect to a test wherein two compliance testers of the fourth embodiment are practically used. That is, in this test, the right and left road wheels of a motor vehicle are respectively put on the two compliance testers. With this, certain forces are applied to the contact points of the respective tires. If the application of the forces to the respective contact points is made with a time lag, the test result would be affectedly the hysteresis possessed by the bushes of the two suspension systems. That is, due to the time lag, compression or expansion of the respective bushes would bring about a difference in deformation characteristic between them.

However, in the fourth embodiment, usage of the electromagnetic valve 23 can eliminate such undesired time lag operation. That is, by suitably controlling the two electromagnetic valves of the two testers, the application of the forces to the respective contact points of the tires can be simultaneously made.

In the following, advantages of the compliance tester of the fourth embodiment will be described.

In addition to the advantages (1), (2) and (3) of the above-mentioned first embodiment, the following advantages are further obtained.

(5) Due to usage of the displacement gauge 24 arranged to measure the relative displacement between the turn table 4 and the vehicle body, a precise measurement is obtained without interference of a displacement of the vehicle body.

(6) As is described hereinabove, the usage of the electromagnetic valve 23 can eliminate undesired time lag operation which would occur when two compliance testers are practically used.

Figure 18:
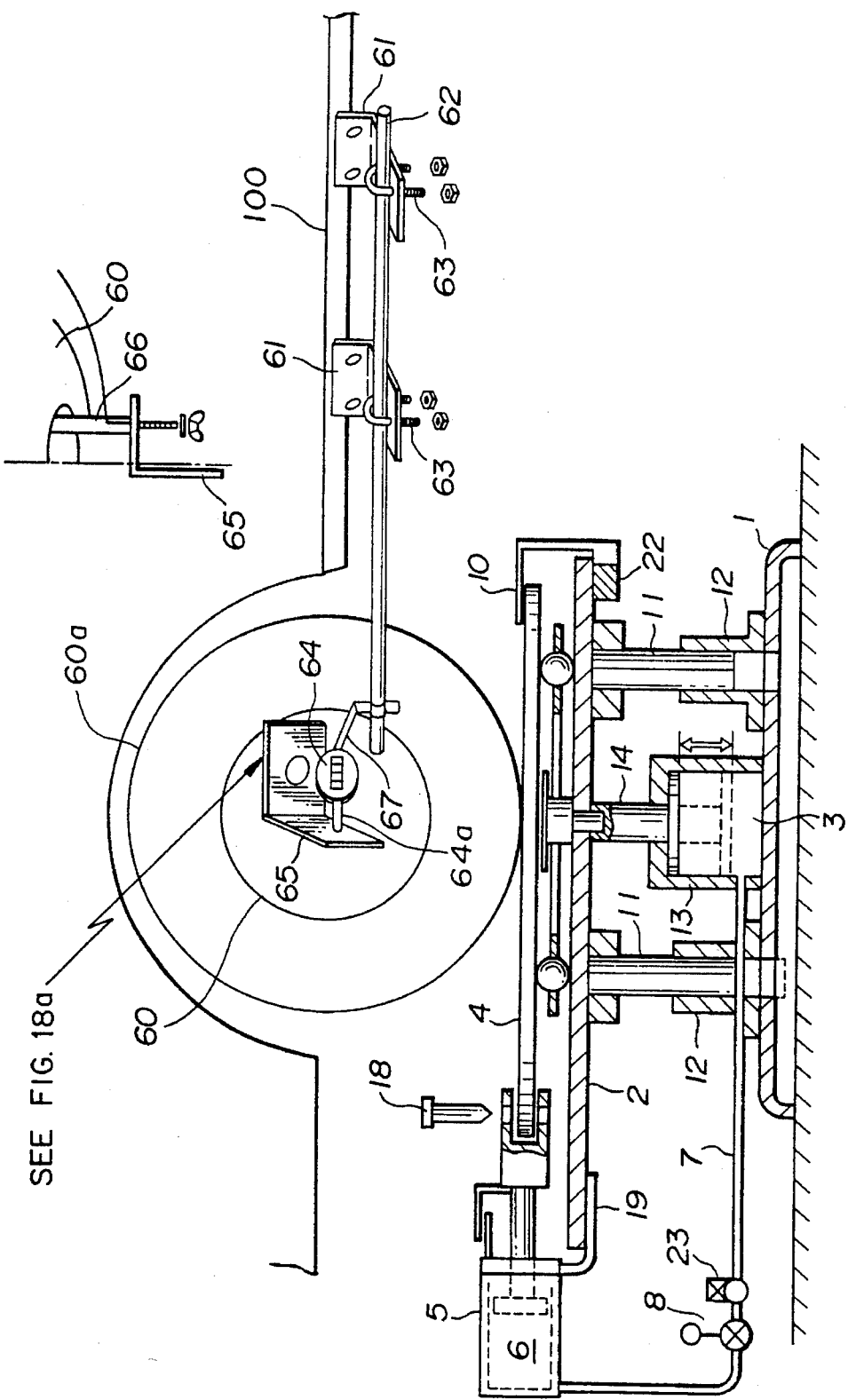
FIG. 18 is a side view of a compliance tester which is a fifth embodiment of the present invention.
Figure 19:
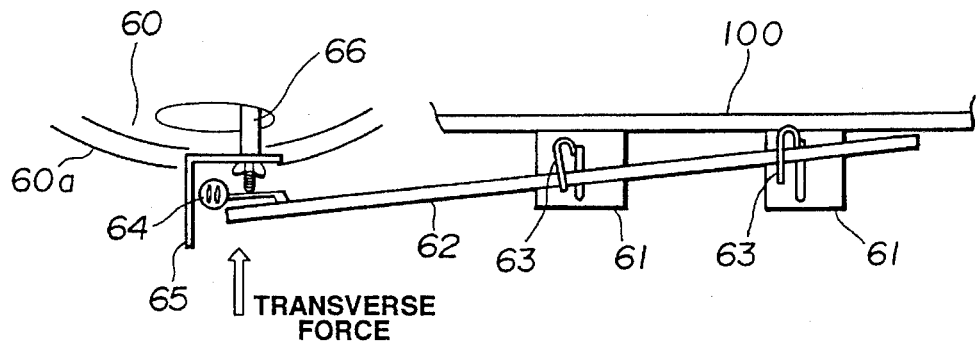
FIG. 19 is a schematic view of the tester of the fifth embodiment in a condition wherein the flexibility is being measured under a transverse force application mode.

Referring to FIG. 18, there is shown a compliance tester which is a fifth embodiment of the present invention.

Since the tester of this fifth embodiment is similar to that of the above-mentioned first embodiment, only portions which are different from those of the first embodiment will be described in the following. The same portions and parts as those of the first embodiment are denotedby the same numerals.

As is seen from FIG. 18, in place of the needle valve 21 (see FIG. 3) and the stroke gauge 9 (see FIG. 3) used in the first embodiment, an electromagnetic valve 23 and a displacement gauge 64 are employed in the fifth embodiment. That is, the displacement gauge 64 is arranged to measure a relative angular displacement between the vehicle body and a road wheel 60 (not tire 60a).

In this embodiment, the following parts are further employed for measuring the relative angular displacement between the road wheel 60 and the vehicle body.

That is, in the drawing, denotedby 61 are brackets secured to the side sill 100 of the vehicle body, 62 is a rod for supporting the displacement gauge 64, 63 are U-bolts for connecting the supporting rod 62 to the brackets 61, 65 is a measurement base plate, 66 is a hub-bolt adapter for connecting the measurement base plate 64 to one of the hub bolts of the road wheel 60 and 67 is a connecting bolt for connecting the displacement gauge 64 to the supporting rod 62.

Figure 20:
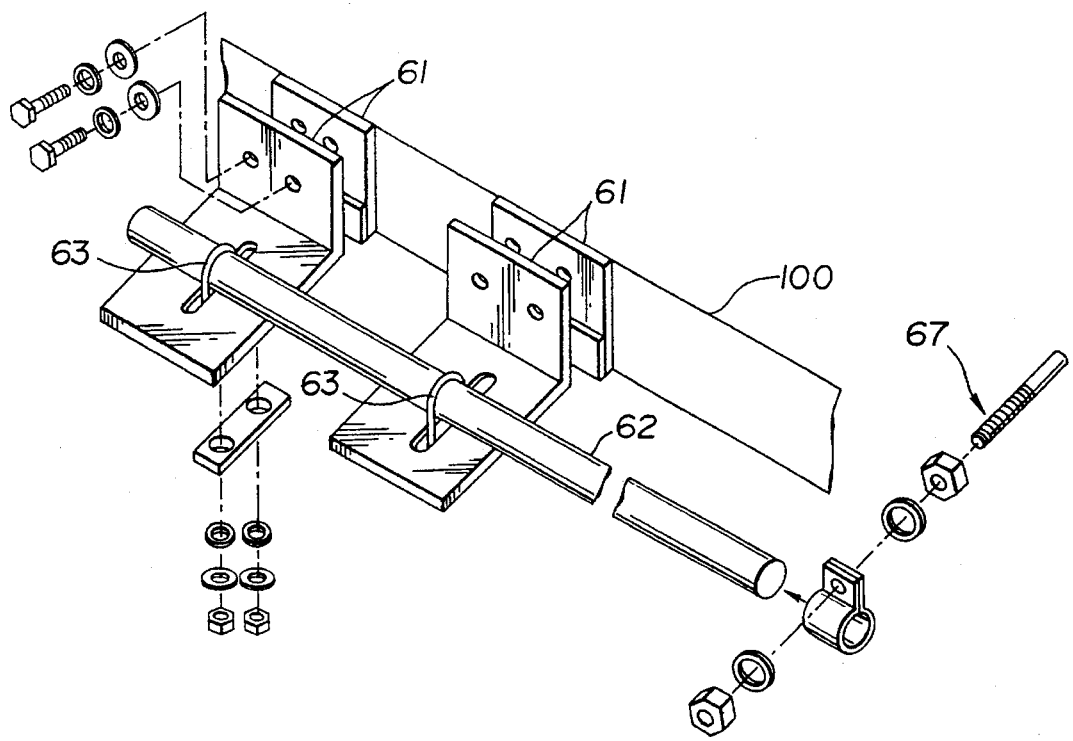
FIG. 20 is a perspective view of parts which constitute a displacement gauge mount of the tester of the fifth embodiment.
Figure 21:
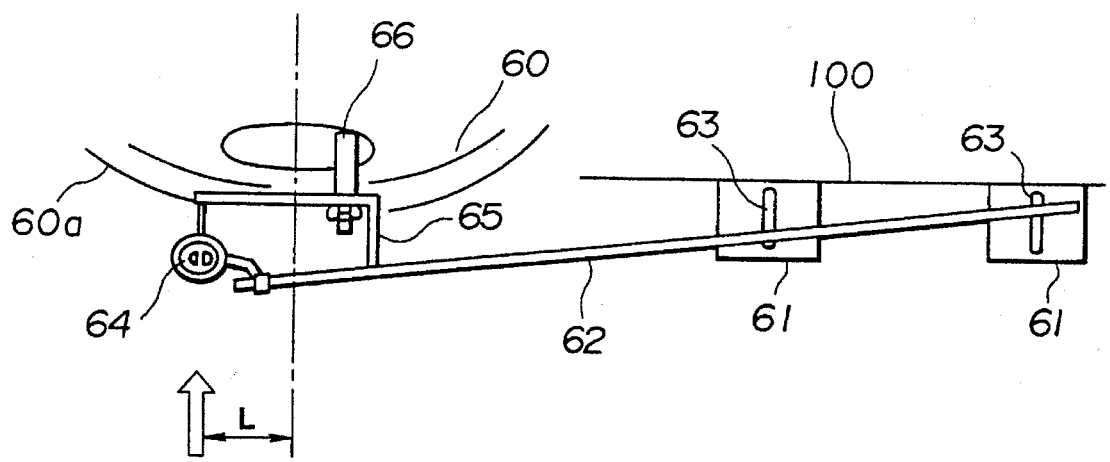
FIG. 21 is a view similar to FIG. 19, but in a condition wherein the flexibility is being measured under a toe angle directed force application mode.

FIG. 20 shows the detail of the arrangement by which the supporting rod 62 is secured to the side sill 100 and through which the connecting bolt 67 is secured to the supporting rod 62.

FIG. 18a shows the detail of the arrangement by which the measurement base plate 65 is secured to one hub bolt of thee road wheel 60.

In order to measure the relative angular displacement between a road wheel 60 (not tire 60a) put on the turn table 4 and the vehicle body, the displacement gauge 64 and the measurement base plate 65 are connected to the vehicle in the above-mentioned manner.

In each test mode, an antenna pin 64a of the gauge 64 is brought into contact with the measurement base plate 65 to establish a base position on which the relative angular displacement is to be based.

It is now to be noted that in the above-mentioned first, second, third and fourth embodiments, the displacement measurement is so made as to measure an overall rigidity of a suspension system which includes the rigidity of the bush and that of the tire 60a.

While, in the fifth embodiment, the displacement measurement is so made as to measure a rigidity of a suspension system which does not include the rigidity of the tire 60a. That is, due to the direct displacement measurement between the road wheel 60 and the vehicle body, the rigidity of the suspension system is not affectedly the rigidity of the tire 60a.

Thus, when, by using the tester of the fifth embodiment, a suspension system of a vehicle is subjected to the compliance test under the transverse force application mode, the transverse rigidity and transverse compliance of the suspension system can be obtained which are not influenced by the characteristic of the tire 60a. Similar to this, by bringing the tester to the longitudinal force application mode or the toe angle directed force application mode, the longitudinal rigidity, the longitudinal compliance, the toe angle directed rigidity and the toe angle directed compliance of the suspension system can be obtained, which are not influenced by the characteristic of the tire 60a.

In the following, advantages of the compliance tester of the fifth embodiment will be described.

In addition to the advantages (1), (2) and (3) of the above-mentioned first embodiment, the following advantages are further obtained.

(7) Due to the above-mentioned arrangement of the displacement gauge 64 and that of the measurement base plate 65, the rigidity and compliance of the suspension system can be obtained without interference of those of the tire.

In the following, modifications of the present invention will be described.

In place of the above-mentioned displacement gauges, electric measuring devices including a digital display may be used.

Although the above-mentioned fourth embodiment is directed to an example wherein two identical compliance testers are used, the compliance testers may be united to constitute a single compliance tester which comprises a tester supporting base, a volume variable oil chamber, a vertically movable base, a power cylinder unit and two turn tables.

What is claimed is:

1. A compliance tester for testing the flexibility of a motor vehicle suspension system which includes a bush, comprising:

a first base;

a second base arranged above said first base;

means defining a fluid chamber whose volume varies when said second base vertically moves relative to said first base;

a table horizontally movably disposed on said second base, said table having an upper surface on which a tire of the motor vehicle is to be put;

a hydraulically operated power unit moved together with said second base, said power unit having a piston connected to said table; and means for fluidly connecting said fluid chamber to a power chamber of said power unit.

2. A compliance tester for testing the flexibility of a motor vehicle suspension system which includes a bush, comprising:

a first base;

a second base arranged above said first base and vertically movable relative to said first base;

chamber means defining a fluid chamber whose volume varies when said second base vertically moves relative to said first base;

a table which moves on an upper surface of said second base, said table having an upper surface on which a tire of the motor vehicle is to be put;

a power cylinder unit moved together with said second base, said power cylinder unit having a hydraulically operated piston whose rod is connected to said table;

passage means for fluidly connecting the fluid chamber of said chamber means with a fluid chamber of said power cylinder unit;

pressure measuring means for measuring the fluid pressure in said fluid chamber of said power cylinder unit; and angular displacement measuring means for measuring a relative angular displacement between said second base and said table, or a relative angular displacement between said table and a given portion of the vehicle body.

3. A compliance tester as claimed in claim 2, in which said table is a turn table which slides and rotates on the upper surface of said second base.

4. A compliance tester as claimed in claim 3, in which said power cylinder unit comprises:

a body having a single cylinder defined therein, said single cylinder constituting a part of said fluid chamber of said power cylinder unit;

a single piston operatively disposed in said single cylinder;

a single rod extending from said single piston;

first means for connecting the piston rod to said table, said first means including a position changing means for changing the position where said piston rod is connected to said table; and second means for connecting said body to said second base, said second means including a position changing means for changing the position where said body is connected to said second base.

5. A compliance tester as claimed in claim 3, in which said power cylinder unit comprises:

a body having a single cylinder defined therein, said single cylinder constituting a part of said fluid chamber of said power cylinder unit;

a single piston operatively disposed in said single cylinder;

two rods extending in the same direction from spaced portions of said single piston;

first means for detachably connecting said two rods to given portions of said table; and second means for connecting said body to said second base.

6. A compliance tester as claimed in claim 2, further comprising a flow rate control valve which is operatively disposed in said passage means.

7. A compliance tester as claimed in claim 6, in which said flow rate control valve is an electromagnetic valve, and in which said angular displacement measuring means is a means which measures the relative angular displacement between said table and the vehicle body.

8. A compliance tester for testing the flexibility of a motor vehicle suspension system which includes a bush, comprising:

a first base;

a second base arranged above said first base and vertically movable relative to said first base;

chamber means defining a fluid chamber whose volume varies when said second base vertically moves relative to said first base;

a table which moves on an upper surface of said second base, said table having an upper surface on which a tire of the motor vehicle is to be put;

a power cylinder unit moved together with said second base, said power cylinder unit having a hydraulically operated piston whose rod is connected to said table;

passage means for fluidly connecting the fluid chamber of said chamber means with a fluid chamber of said power cylinder unit;

pressure measuring means for measuring the fluid pressure in said fluid chamber of said power cylinder unit; and angular displacement measuring means for measuring a relative angular displacement between a road wheel which has said tire mounted thereon and a given portion of the vehicle body.

9. A compliance tester as claimed in claim 8, in which said angular displacement measuring means comprises:

a rod which is to be secured to a side sill of the vehicle;

a displacement gauge fixed to one end of said rod; and a measurement base plate which is to be fixed to said road wheel.

10. A compliance tester as claimed in claim 9, in which said measurement base plate is detachably connected to one of hub bolts of said road wheel.

* * * * *